(12) United States Patent
Mercier et al.

(10) Patent No.: US 10,850,231 B2
(45) Date of Patent: *Dec. 1, 2020

(54) CARBON DIOXIDE CHEMICAL SEQUESTRATION FROM INDUSTRIAL EMISSIONS BY CARBONATION

(71) Applicant: Institut National de la Recherche Scientifique, Quebec (CA)

(72) Inventors: Guy Mercier, Quebec (CA); Jean-Francois Blais, Quebec (CA); Emmanuelle Cecchi, Quebec (CA); Sanoopkumar Puthiya Veetil, Kannur (IN); Louis-Cesar Pasquier, St Gilles Croix de Vie (FR); Sandra Kentish, Victoria (AU)

(73) Assignee: Institut National de la Recherche Scientifique, Quebec (CA)

( * ) Notice: Subject to any disclaimer, the term of this patent is extended or adjusted under 35 U.S.C. 154(b) by 116 days.

This patent is subject to a terminal disclaimer.

(21) Appl. No.: 16/179,350

(22) Filed: Nov. 2, 2018

(65) Prior Publication Data

US 2019/0070556 A1   Mar. 7, 2019

Related U.S. Application Data

(63) Continuation of application No. 15/221,716, filed on Jul. 28, 2016, now Pat. No. 10,150,079, which is a continuation of application No. 14/383,320, filed as application No. PCT/CA2013/050170 on Mar. 7, 2013, now Pat. No. 9,440,189.

(30) Foreign Application Priority Data

Mar. 7, 2012  (CA) ...................... 2771111

(51) Int. Cl.
| | | |
|---|---|---|
| *C01F 5/24* | (2006.01) | |
| *B01D 53/62* | (2006.01) | |
| *C01F 11/18* | (2006.01) | |
| *B01D 53/78* | (2006.01) | |
| *B01D 53/80* | (2006.01) | |
| *B01D 53/81* | (2006.01) | |

(52) U.S. Cl.
CPC ............ B01D 53/62 (2013.01); B01D 53/78 (2013.01); C01F 5/24 (2013.01); C01F 11/181 (2013.01); *B01D 53/80* (2013.01); *B01D 53/81* (2013.01); *B01D 2251/402* (2013.01); *B01D 2251/404* (2013.01); *B01D 2253/106* (2013.01); *B01D 2253/112* (2013.01); *B01D 2257/504* (2013.01); *Y02A 50/2342* (2018.01); *Y02C 10/04* (2013.01)

(58) Field of Classification Search
CPC .................. C01F 5/24; B01D 53/62
See application file for complete search history.

(56) References Cited

U.S. PATENT DOCUMENTS

| | | |
|---|---|---|
| 4,210,626 A | 7/1980 | Berrie et al. |
| 6,623,555 B1 | 9/2003 | Haverinen et al. |
| 7,604,787 B2 | 10/2009 | Maroto-Valer et al. |
| 7,682,589 B2 | 3/2010 | Gorset et al. |
| 7,731,921 B2 | 6/2010 | Geerlings et al. |
| 7,815,880 B2 | 10/2010 | Constantz et al. |
| 7,863,367 B2 | 1/2011 | Takahashi et al. |
| 7,919,064 B2 | 4/2011 | Kawatra et al. |
| 8,105,558 B2 | 1/2012 | Comrie |
| 8,114,374 B2 | 2/2012 | Blencoe et al. |
| 9,108,151 B2 | 8/2015 | Brent |
| 9,440,189 B2 | 9/2016 | Mercier et al. |
| 10,150,079 B2 * | 12/2018 | Mercier ............... B01D 53/78 |
| 2004/0131531 A1 | 7/2004 | Geerlings et al. |
| 2007/0202032 A1 | 8/2007 | Geerlings et al. |
| 2007/0261947 A1 | 11/2007 | Geerlings et al. |
| 2008/0277319 A1 | 11/2008 | Wyrsta |
| 2008/0299024 A1 | 12/2008 | Gorset et al. |
| 2010/0196235 A1 | 8/2010 | Geerlings et al. |
| 2010/0221163 A1 | 9/2010 | DaCosta et al. |
| 2011/0256048 A1 | 10/2011 | Brent |

(Continued)

FOREIGN PATENT DOCUMENTS

| | | |
|---|---|---|
| DE | 196 22 292 A1 | 12/1996 |
| WO | WO 2008/061305 A1 | 5/2008 |
| WO | WO 2009/092718 A1 | 7/2009 |

OTHER PUBLICATIONS

Baciocchi et al. "Carbonation of Stainless Steel Slag as a Process for $CO_2$ Storage and Slag Valorization" *Waste and Biomass Valorization* 1(4):467-477 (2010).

Bobicki et al. "Carbon capture and storage using alkaline industrial wastes" *Progress in Energy and Combustion Science* 38(2):302-320 (2012).

Bonenfant et al. "$CO_2$ Sequestration Potential of Steel Slags at Ambient Pressure and Temperature" *Industrial & Engineering Chemistry Research* 47(20):7610-7616 (2008).

Gerdemann et al. "Ex Situ Aqueous Mineral Carbonation" *Environmental Science & Technology* 41(7):2587-2593 (2007).

(Continued)

*Primary Examiner* — Stuart L Hendrickson
(74) *Attorney, Agent, or Firm* — Myers Bigel, P.A.

(57) ABSTRACT

Techniques are described for chemical sequestration of carbon dioxide and production of precipitated magnesium carbonate. The process can include contacting carbon dioxide from industrial emissions with water and magnesium-containing particulate material, such as serpentinite, which is thermally pre-treated and has a particle size of at most 75 microns. The process can also include separation of the loaded aqueous stream from the solids, followed by precipitation of magnesium carbonate material that includes carbon and oxygen from industrial emissions and magnesium from serpentinite or chrysotile mining residue, for example.

20 Claims, 7 Drawing Sheets

(56) References Cited

U.S. PATENT DOCUMENTS

2012/0177552 A1    7/2012  Billings

OTHER PUBLICATIONS

Huijgen et al. "Mineral $CO_2$ Sequestration by Steel Slag Carbonation" *Environmental Science & Technology* 39(24):9676-9682 (2005).

McKelvy et al. "Exploration of the Role of Heat Activation in Enhancing Serpentine Carbon Sequestration Reactions" *Environmental Science & Technology* 38(24):6897-6903 (2004).

Nagamori et al. "The activation of magnesia in serpentine by calcination and the chemical utilization of asbestos tailings—a review" *CIM Bulletin* 73(824):144-156 (1980).

O'Connor et al. "Aqueous Mineral Carbonation: Mineral Availability, Pretreatment, Reaction Parametrics, and Process Studies" *Office of Process Development National Energy Technology Laboratory (formerly Albany Research Center) Office of Fossil Energy, US DOE* DOE/ARC-TR-04-002 (25 pages) (2005).

Pan et al. "$CO_2$ Capture by Accelerated Carbonation of Alkaline Wastes: A Review on Its Principles and Applications" *Aerosol and Air Quality Research* 12:770-791 (2012).

Sanna et al. "Waste materials for carbon capture and storage by mineralisation (CCSM)—A UK perspective" *Applied Energy* 99:545-554 (2012).

Santos et al. "Stabilization of basic oxygen furnace slag by hot-stage carbonation treatment" *Chemical Engineering Journal* 203:239-250 (2012).

\* cited by examiner

CARBON DIOXIDE CHEMICAL SEQUESTRATION FROM INDUSTRIAL EMISSIONS BY CARBONATION

RELATED APPLICATIONS

This application is a continuation of U.S. patent application Ser. No. 15/221,716, filed Jul. 28, 2016, which is a continuation of U.S. patent application Ser. No. 14/383,320, filed Sep. 5, 2014, which is a 35 U.S.C. § 371 national stage application of International Application No. PCT/CA2013/050170, filed Mar. 7, 2013, which claims priority to Canadian Application No. 2771111, filed Mar. 7, 2012, the disclosures of each of which are hereby incorporated by reference herein in their entirety.

FIELD OF THE INVENTION

The present invention relates to sequestration of carbon dioxide, and more particularly to chemical sequestration of carbon dioxide from industrial emissions by carbonation of an alkaline earth metal material.

BACKGROUND OF THE INVENTION

There are various methodologies that have been proposed for sequestering carbon dioxide.

Carbon dioxide is a greenhouse gas commonly contained in industrial emissions and it is desirable to sequester carbon dioxide gas in solid form.

In addition, there are various waste residues such as mining residue or waste concrete that are accumulated and not utilized for industrial processing.

Some background patent documents are as follows: U.S. Pat. Nos. 7,604,787, 7,731,921, 7,815,880, 7,919,064; 8,105,558, 8,114,374, US 2004/0131531, US 2007/022032, US 2007/0261947, US 2008/0112868, US 2008/0277319, US 2008/0299024, US 2010/0196235, US 2010/0221163, US 2011/0256048, US 2012/0177552, WO 2008/061305, WO 2009/092718.

Another previous report from the Albany Research Center, describes an ex situ industrial carbonation of serpentinite and describes it as an unviable option. 100% $CO_2$, critical high pressure and temperature, and pure mineral phases were used. [Gerdemann S J, O'Connor W K, Dahlin D C, Penner L R and Rush H. (2007) Ex situ aqueous mineral carbonation. Environ. Sci. Technol. 41, 2587-2593] determines the cost of about $54 per ton of $CO_2$ (realizing no profit), which is a price derived from extraction of serpentinite, a costly high pressure mineralization process, and with no revalorisation of the magnesium carbonate.

There is indeed a need for a technology that overcomes at least some of the disadvantages of the carbon dioxide sequestration techniques that are known in the field, and also that utilizes industrial emissions and alkaline earth metal containing residues.

SUMMARY OF THE INVENTION

The present invention provides various techniques related to the sequestration of carbon dioxide and the production of carbonate materials.

In one aspect, there is provided a process for sequestering carbon dioxide from a carbon dioxide containing gas. The process includes:

contacting the carbon dioxide containing gas with an aqueous slurry including an alkaline earth metal containing material in a carbonation unit for carbonation of at least a portion of an alkaline earth metal to produce a carbon dioxide depleted gas and a carbonate loaded slurry including precipitable carbonates and substantially exempt of precipitated alkaline earth metal carbonates;

removing the carbonate loaded slurry from the carbonation unit and separating the carbonate loaded slurry into an aqueous phase including the precipitable carbonates and a solid phase; and supplying the aqueous phase to a precipitation unit and precipitating alkaline earth metal carbonates in the precipitation unit to produce a precipitation slurry.

In an optional aspect, the aqueous phase may include the precipitable carbonates and may be substantially exempt of precipitated alkaline earth metal carbonates.

In an optional aspect, the process may further include the step of agitating the aqueous slurry including an alkaline earth metal containing material during the step of contacting in the carbonation unit. Optionally, the process may also include the step of agitating the aqueous phase during the step of precipitating the alkaline earth metal carbonates in the precipitation unit.

In an optional aspect, the process may further include the step of mixing the alkaline earth metal containing material with water, prior to the step of contacting, to dissolve alkaline earth metal ions in aqueous phase and form the aqueous slurry.

In another optional aspect, the process may further include the step of mixing the alkaline earth metal containing material with water, simultaneously to the step of contacting, to dissolve alkaline earth metal ions in aqueous phase and form the aqueous slurry within the carbonation unit.

Optionally, the step of mixing may be performed so as to form the aqueous slurry having a mass concentration between 25 g/L and 300 g/L in grams of total solids per liter of aqueous slurry.

In an optional aspect, the process may further include separating the precipitation slurry into a solid stream including the alkaline earth metal carbonates and an aqueous stream.

In an optional aspect, the process may further include drying the solid stream including the alkaline earth metal carbonates.

In an optional aspect, the process may further include recycling at least a portion of the aqueous stream into the carbonation unit.

In an optional aspect, the process may further include recycling at least a portion of the solid phase into the carbonation unit as at least part of the alkaline earth metal containing material for contacting with the carbon dioxide containing gas.

In an optional aspect, the process may further include thermally pre-treating the alkaline earth metal containing material for dehydroxylation thereof, to produce a pre-treated alkaline metal earth containing material for contacting with the carbon dioxide containing gas. Optionally, the step of thermally pre-treating the alkaline earth metal containing material may include heating the alkaline metal earth containing material at a temperature between about 500° C. and about 800° C. during a pre-treating time of about 10 minutes to about 60 minutes. Optionally, the temperature may be between about 600° C. and about 700° C. and the pre-treating time may be between about 15 minutes and about 40 minutes.

In an optional aspect, the process may further include crushing and/or grinding the alkaline metal earth containing material prior to the step of contacting with the carbon dioxide containing gas. Optionally, the step of crushing and/or grinding may be performed prior to the step of thermally pre-treating the alkaline earth metal containing material. Further optionally, the step of crushing and/or grinding may be performed to obtain solid particles having a median particle size between about 10 μm and about 45 μm and so as to obtain 90% of the solid particles having a particle size between about 0 μm and about 75 μm.

In an optional aspect, the carbon dioxide containing gas may be derived from industrial emissions and may have a carbon dioxide concentration between 1% and 30%.

In an optional aspect, the process may further include controlling at least one of a carbonation temperature, an agitation speed and a carbonation pressure in the carbonation unit.

Optionally, the step of contacting in the carbonation unit may be performed at the carbonation temperature between about 10° C. and about 40° C. Optionally, the carbonation temperature may be between about 20° C. and about 30° C.

Optionally, the step of contacting in the carbonation unit may be performed at the carbonation pressure between about 1 bar and about 20 bars. Optionally, the carbonation pressure may be between about 2 bars and about 12 bars.

Optionally, the agitation speed in the carbonation unit may be between about 400 rpm and about 800 rpm, and further optionally between about 500 rpm and about 650 rpm.

In an optional aspect, the step of precipitating may be performed at a precipitation temperature between about 20° C. and about 80° C. for a precipitation time between about 0.5 hours and about 12 hours. Optionally, the step of precipitating may include agitating the aqueous phase.

In an optional aspect, the alkaline earth metal containing material may include at least one of sandstone, granite, anorthosite, basalt, serpentinite, peridotite, serpentinized peridotite, ophiolitic rocks, mafic and ultramafic rocks, rocks containing more than 10% of pyroxene and peridot, calcium silicate, magnesium silicate, feldspar, plagioclase feldspar, peridot, pyroxene, olivine, serpentine, wollastonite, calcium oxide, magnesium oxide, brucite, mafic and ultramafic minerals, steelmaking slag, steelmaking worn MgO brick, rotary kiln dust (CKD, LKD), waste cement, waste concrete, construction and demolition waste, concrete with aggregates, concrete brick, concrete, red brick, phyllosilicate mining residue and chrysotile mining residue.

In an optional aspect, the alkaline earth metal may include calcium or magnesium.

In an optional aspect, the process may further include supplying continuously the carbon dioxide containing gas to the carbonation unit. Optionally, the process may include controlling or managing a maximal quantity of dissolved carbon dioxide in the carbonate loaded slurry produced in the carbonation unit, the maximal quantity of dissolved carbon dioxide being chosen to reduce or avoid precipitation of the alkaline earth metal carbonates in the carbonation unit. Optionally, the maximal quantity of dissolved carbon dioxide may be at most 5 g/L.

In another optional aspect, the carbon dioxide containing gas may include a plurality of carbon dioxide containing gas portions, the process including:
supplying at least one carbon dioxide containing gas portion to the carbonation unit;
contacting the aqueous slurry with the at least one carbon dioxide containing gas portion in the carbonation unit for production of the carbonate loaded slurry;
removing the carbonate loaded slurry from the carbonation unit and separating the carbonate loaded slurry into the aqueous phase including the precipitable carbonates and the solid phase; and
recycling the solid phase to the carbonation unit and supplying water to the carbonation unit to form a new portion of aqueous slurry;
contacting the new portion of aqueous slurry with another carbon dioxide containing gas portion for production of the carbonate loaded slurry.

In an optional aspect, the carbon dioxide containing gas may be supplied to the carbonation unit as a plurality of carbon dioxide containing gas portions, the process including:
contacting the aqueous slurry with at least one carbon dioxide containing gas portion in the carbonation unit for production of the carbonate loaded slurry;
removing the carbonate loaded slurry from the carbonation unit and separating the carbonate loaded slurry into the aqueous phase including the precipitable carbonates and the solid phase; and
supplying the aqueous phase including the precipitable carbonates to the precipitation unit, precipitating the alkaline earth metal carbonates in the precipitation unit to produce the precipitation slurry and separating the precipitation slurry into a solid stream including the alkaline earth metal carbonates and an aqueous stream;
recycling the solid phase and the aqueous stream to the carbonation unit to produce a new portion of aqueous slurry and contacting the new portion of aqueous slurry with another carbon dioxide containing gas portion for production of the carbonate loaded slurry.

Optionally, the process may include supplying water to the carbonation unit as a make up stream of the new portion of aqueous slurry.

In an optional aspect, the step of contacting in the carbonation unit may be performed for a maximal gas contact time, the maximal gas contact time being controlled or managed to reduce or avoid precipitation of the alkaline earth metal carbonates in the carbonation unit. Optionally, the maximal gas contact time may be between about 1 minute and about 60 minutes.

In an optional aspect, the process may also include crushing and/or grinding the solid phase prior to the step of recycling to the carbonation unit to produce the new portion of aqueous slurry.

In another aspect, there is provided a process for sequestering carbon dioxide from a carbon dioxide containing gas. The process includes:
contacting the carbon dioxide containing gas with an aqueous slurry including a magnesium containing material in a carbonation unit at a carbonation temperature between about 10° C. and about 40° C. and a carbonation pressure between about 1 bar and about 20 bars, for carbonation of at least a portion of magnesium to produce a carbon dioxide depleted gas and a carbonate loaded slurry including precipitable carbonates and substantially exempt of precipitated magnesium carbonates.

In an optional aspect, the process may include:
removing the carbonate loaded slurry from the carbonation unit and separating the carbonate loaded slurry into a solid phase and an aqueous phase including precipitable carbonates and substantially exempt of precipitated magnesium carbonates; and supplying the aqueous phase to a precipitation unit and precipitating magnesium carbonates in the precipitation unit to produce a precipitation slurry including the precipitated magnesium carbonates.

In an optional aspect, the process may further include separating the precipitation slurry into a solid stream including the precipitated magnesium carbonates and an aqueous stream.

In another aspect, there is provided a process for sequestering carbon dioxide from a carbon dioxide containing gas, the process including contacting the carbon dioxide containing gas with an alkaline earth metal containing material in a substantially dry form in at least one carbonation unit at a carbonation temperature between about 200° C. and about 500° C. and a carbonation pressure between about 1 bar and about 20 bars, for carbonation thereof to produce carbonates and a carbon dioxide depleted gas.

In another aspect, there is provided a method for sequestering carbon dioxide from industrial emissions by contacting the industrial emissions with magnesium silicate material, in wet or dry form, to produce a carbon dioxide depleted gas and a carbonated magnesium silicate material.

In another aspect, there is provided a method for manufacturing alkaline earth metal carbonates, the method including:
  a contacting stage wherein industrial emissions including carbon dioxide are contacted with an aqueous slurry including an alkaline earth metal containing material, to produce a carbon dioxide depleted gas and an alkaline earth metal carbonate stream substantially exempt of precipitated alkaline earth metal carbonates;
  a precipitation stage wherein alkaline earth metal carbonates are precipitated from the alkaline earth metal carbonate stream, thereby producing a precipitation slurry; and
  a separation stage wherein the precipitation slurry is separated into the precipitated alkaline earth metal carbonates and an aqueous phase.

In another aspect, there is provided a method for manufacturing alkaline earth metal carbonates, the method including:
  a contacting stage wherein industrial emissions including carbon dioxide are contacted with an aqueous slurry including an alkaline earth metal containing material, to produce a carbon dioxide depleted gas and an alkaline earth metal carbonate stream including precipitable carbonates and substantially exempt of precipitated alkaline earth metal carbonates;
  a first separation stage wherein the alkaline earth metal carbonate stream is separated into a solid phase and an aqueous phase including the precipitable carbonates and substantially exempt of precipitated alkaline earth metal carbonates;
  a recycling stage wherein the solid phase is recycled to the carbonation stage as at least a portion of the alkaline earth metal containing material;
  a precipitation stage wherein alkaline earth metal carbonates are precipitated from the aqueous phase, thereby producing a precipitation slurry including the precipitated alkaline earth metal carbonates; and
  a separation stage wherein the precipitation slurry is separated into the precipitated alkaline earth metal carbonates and an aqueous phase.

In another aspect, there is provided a carbon dioxide sequestration system for sequestering carbon dioxide from a carbon dioxide containing gas. The system includes:
  at least one carbonation unit having:
    a gas inlet for receiving the carbon dioxide containing gas,
    a slurry inlet for receiving an aqueous slurry including an alkaline earth metal containing material,
    a carbonation vessel for the carbonation of at least a portion of an alkaline earth metal of the aqueous slurry with carbon dioxide to produce a carbon dioxide depleted gas and a carbonate loaded slurry including precipitable carbonates and substantially exempt of precipitated alkaline earth metal carbonates,
    a slurry outlet for releasing the carbonate loaded slurry including precipitable carbonates, and
    a gas outlet for releasing the carbon dioxide depleted gas;
  a separation unit having:
    a slurry inlet for receiving the carbonate loaded slurry including precipitable carbonates from the slurry outlet of the at least one carbonation unit,
    a separation chamber for separation of the carbonate loaded slurry including precipitable carbonates into a solid phase and an aqueous phase including the precipitable carbonates and substantially exempt of precipitated alkaline earth metal carbonates,
    a liquid outlet for releasing the aqueous phase, and
    a solid outlet for releasing the solid phase; and
  a precipitation unit having:
    a slurry inlet for receiving the aqueous phase including the precipitable carbonates from the liquid outlet of the separation unit,
    a precipitation chamber for precipitation of the alkaline earth metal carbonates and formation of a precipitation slurry, and
    a liquid outlet for releasing the precipitation slurry.

In another aspect, there is provided a use of a magnesium containing material in the form of an aqueous slurry to contact and sequestrate carbon dioxide from a carbon dioxide containing gas at a temperature between about 20° C. and about 30° C. and a pressure between about 2 bars and about 12 bars to form magnesium carbonates.

In another aspect, there is provided a use of a phyllosilicate mining residue to sequestrate carbon dioxide from industrial emissions and produce magnesium carbonates. Optionally, the phyllosilicate mining residue includes at least one of lizardite, antigorite, brucite, iron oxide, chromium oxide and chrysotile.

In another aspect, there is provided a precipitated calcium or magnesium carbonate (PCC or PMC) produced by contacting a calcium or magnesium containing material in wet form with carbon dioxide from industrial emissions in a carbonation unit to form a carbonate loaded slurry, and precipitating the calcium or magnesium carbonate from the carbonate loaded slurry in a precipitation unit.

In another aspect, there is provided a precipitated calcium or magnesium carbonate (PCC or PMC) including at least 95 wt % of calcium or magnesium carbonate in dry form or hydrated form.

BRIEF DESCRIPTION OF THE DRAWINGS

Some embodiments, aspects and implementations of the present invention are represented in and will be further understood in connection with the following figures.

Figure 1:
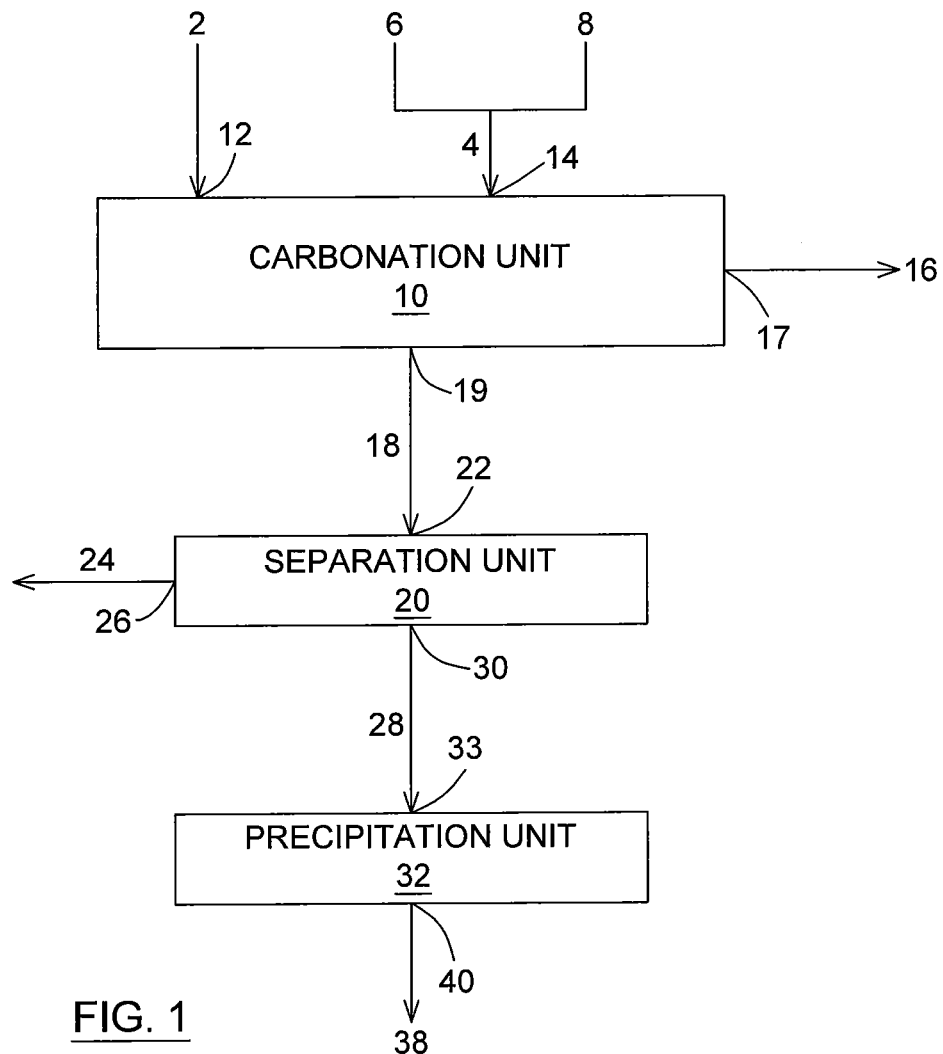
FIG. 1 is a process flow diagram of wet carbonation according to an optional aspect of the present invention.

While the invention will be described in conjunction with example embodiments, it will be understood that it is not intended to limit the scope of the invention to these embodiments. On the contrary, it is intended to cover all alternatives, modifications and equivalents as may be included as defined by the appended claims.

DETAILED DESCRIPTION

Various techniques are described herein for sequestering carbon dioxide and producing alkaline earth metal carbonates.

In one aspect, there is provided a process for chemically sequestering carbon dioxide from a carbon dioxide containing gas by producing alkaline earth metal carbonates. The carbon dioxide containing gas may be issued from industrial emissions and have various carbon dioxide concentrations according to the industrial process from which the emissions are derived.

In some optional aspects, there is provided a process for carbon dioxide chemical sequestration from industrial emissions that contain carbon dioxide by carbonation using magnesium or calcium silicate.

Much of the research up to this juncture has been performed using gases containing 100% $CO_2$, which implies that carbon dioxide from the chimney of an industrial facility must first be concentrated using separate technologies before it can be treated using carbonation. This implies a more costly process. In 2011, a carbon capture and sequestration (CCS) pilot plant opened at a coal fired facility in the United Kingdom. Experts have estimated that 16% to 40% of the energy produced could end up being used to capture and store carbon. This corresponds to a 100 million dollar producing electricity plant to a cost between 16 to 40 million dollars.

Embodiments of the present invention may enable increasing the economic viability by providing profit or a cost between zero to 10% of the value of the produced energy.

In some optional aspects, the carbon dioxide containing gas may advantageously be gas emissions that are directly used as they are produced from a plant. For example, for a cement factory, one may use a gas containing 18.2% $CO_2$, 4.11% $O_2$ and 77.69% $N_2$. Optionally, the carbon dioxide containing gas derived from industrial emissions may have a carbon dioxide concentration between about 1% and about 30%.

Embodiments of the present invention may also enable to produce valuable alkaline earth metal carbonates from an alkaline earth metal containing material.

It should be understood that the alkaline earth metal containing material may be a natural material that may include but is not limited to alkaline earth metal containing minerals and alkaline earth metal containing rocks. For example, the alkaline earth metal containing material may include serpentine or serpentinite. Optionally, the alkaline earth metal containing material may include alkaline earth metal containing rocks such as sandstone, granite, anorthosite, basalt, serpentinite, peridotite, serpentinized peridotite, ophiolitic rocks, mafic and ultramafic rocks (containing Mg and Fe minerals), rocks containing more than 10% of pyroxene and peridot, or a combination thereof. Optionally, the alkaline earth metal containing material may also include a phyllosilicate. Further optionally, the alkaline earth metal containing material may include alkaline earth metal containing minerals such as calcium silicate, magnesium silicate, feldspar, plagioclase feldspar (andesine), peridot (olivine sand), pyroxene (enstatite olivine sand), olivine, serpentine (as in mineral family containing antigorite, chrysotile, lizardite), wollastonite, calcium oxide (CaO), magnesium oxide or periclase (MgO), brucite ($Mg(OH)_2$), mafic and ultramafic minerals (containing Mg and Fe), or a combination thereof.

The alkaline earth metal containing material may also be issued from various industrial wastes or residues such as slag, cement waste, mining processing waste and mineral processing waste, which are available without the need to be mined from geological formations. Optionally, the slag may include steelmaking slag, steelmaking worn MgO brick or a combination thereof. Optionally, the cement waste may include rotary kiln dust (CKD, LKD), waste cement, waste concrete, construction and demolition waste, concrete with aggregates, concrete brick, concrete, red brick or a combination thereof. Optionally, the mining and mineral processing waste may include phyllosilicate mining residue, chrysotile mining residue, serpentine (as in the rock matrix containing the ore) or a combination thereof.

Therefore, embodiments of the present invention may further benefit from additional advantages regarding the efficiency and cost of the process.

Referring to FIG. 1, in some implementations, the process includes the step of supplying the carbon dioxide containing gas 2 and an aqueous slurry 4 including an alkaline earth metal containing material 6 and water 8 to a carbonation unit 10. The carbonation unit 10 may include a gas inlet 12 for receiving the carbon dioxide containing gas 2 and a slurry inlet 14 for receiving the aqueous slurry 4. The process then includes the step of contacting the carbon dioxide containing gas 2 and the aqueous slurry 4 in the carbonation unit 10, for carbonation of at least a portion of the alkaline earth metal. A carbon dioxide depleted gas 16 and a carbonate partially loaded slurry 18 including precipitable carbonates are produced. The process may also include the step of removing the carbon dioxide depleted gas 16 from the carbonation unit 10 through a gas outlet 17, and the carbonate loaded slurry 18 through a slurry outlet 19. In some implementations, the carbonate loaded slurry contains substantially no precipitated carbonates within and as it is released from the carbonation unit 10. The carbonate loaded slurry 18 is then separated in a separation unit 20 into a solid phase 24 and an aqueous phase 28 including the precipitable carbonates, which are respectively released from the separation unit 20 via a solid outlet 26 and a liquid outlet 30. In some implementations, the aqueous phase 28 contains substantially no precipitated carbonates within and as it is released from the separation unit 20. The aqueous phase 28 may be then supplied to a precipitation unit 32 via a liquid inlet 33. The process may include precipitating at least a portion of the precipitable carbonates of the aqueous phase 28 into alkaline earth metal carbonates in the precipitation unit 32, thereby producing a precipitation slurry 38 including the alkaline earth metal carbonates which is released from the precipitation unit 32 via a slurry outlet 40.

Figure 2:
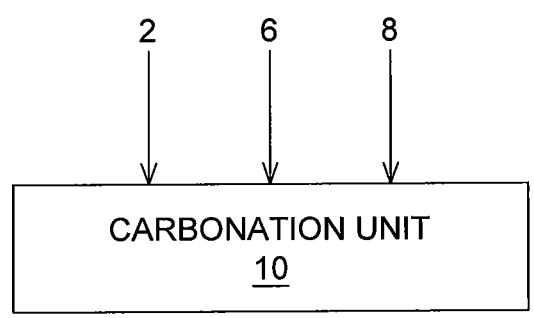
FIG. 2 is a schematic of carbonation unit according to an optional aspect of the present invention.

It should be understood that the aqueous slurry 4 including the alkaline earth metal containing material 6 may be formed prior to being supplied to the carbonation unit 10 as seen in FIG. 2, but may also be directly formed in the carbonation unit 10 by supplying separately the alkaline earth metal containing material 6 and water 8 to the carbonation unit 10.

In some optional aspects, the process may further include the step of agitating the aqueous slurry in the carbonation unit to enhance contact between the carbon dioxide containing gas and the alkaline earth metal containing material. The agitation may be ensured by a mechanical agitator such as a propeller having an agitation speed between about 400 rpm and about 800 rpm, optionally between about 500 rpm and about 650 rpm. It should be understood that the agitation step is not limited to a mechanical agitation and may include various known and suitable agitation techniques such as gas fluidisation.

In other optional aspects, the process may also include agitating the aqueous phase in the precipitation unit to enhance precipitation of the alkaline earth metal carbonates.

In some optional aspects, the alkaline earth metal containing material may be mixed with water so as to obtain the aqueous slurry having a pulp density (also referred to as mass concentration of total solids per liter of slurry) between 25 g/L and 300 g/L. A low pulp density may favor the dissolution of the alkaline earth metal in the aqueous slurry. The influence of the density of the aqueous slurry on carbon dioxide removal efficiency is shown in Example 2.

In some optional aspects, the process may include thermally pre-treating the alkaline earth containing material to perform dehydroxylation. The alkaline earth containing material may indeed include undesirable water which is at least partially removed with the thermal pre-treatment. During the thermal pre-treatment, water is vaporized and the crystalline structure of the alkaline earth metal containing material may be changed into a more chemically active structure, allowing better dissolution of the alkaline earth metal in aqueous phase. Optionally, the process may include heating the alkaline earth metal containing material at a pre-treating temperature between about 500° C. and about 800° C. during a pre-treating time between about 10 minutes and about 60 minutes. Optionally, the pre-treating temperature may be between about 600° C. and about 700° C. and the pre-treating time may be between about 15 minutes and about 40 minutes. Optionally, the pre-treating temperature may be sufficiently low to avoid recrystallization of the alkaline earth metal containing material. The influence of the thermal pre-treatment on carbon dioxide removal efficiency is shown in Example 3.

In some optional aspects, the process may include crushing and/or grinding the alkaline earth metal containing material to enhance the available surface for contact with the carbon dioxide containing gas and favor carbonation of the alkaline earth metal. Optionally, the alkaline earth metal containing material may be crushed and/or grinded such that the average size of the material particles is between about 10 µm and about 45 µm and such that at least about 90% of the solid particles having a particle size between about 0 µm and about 75 µm. Optionally, the crushing and/or grinding step may be performed before the thermal pre-treating step as the dehydroxylation may be favored by using material particles of reduced size.

Figure 3:
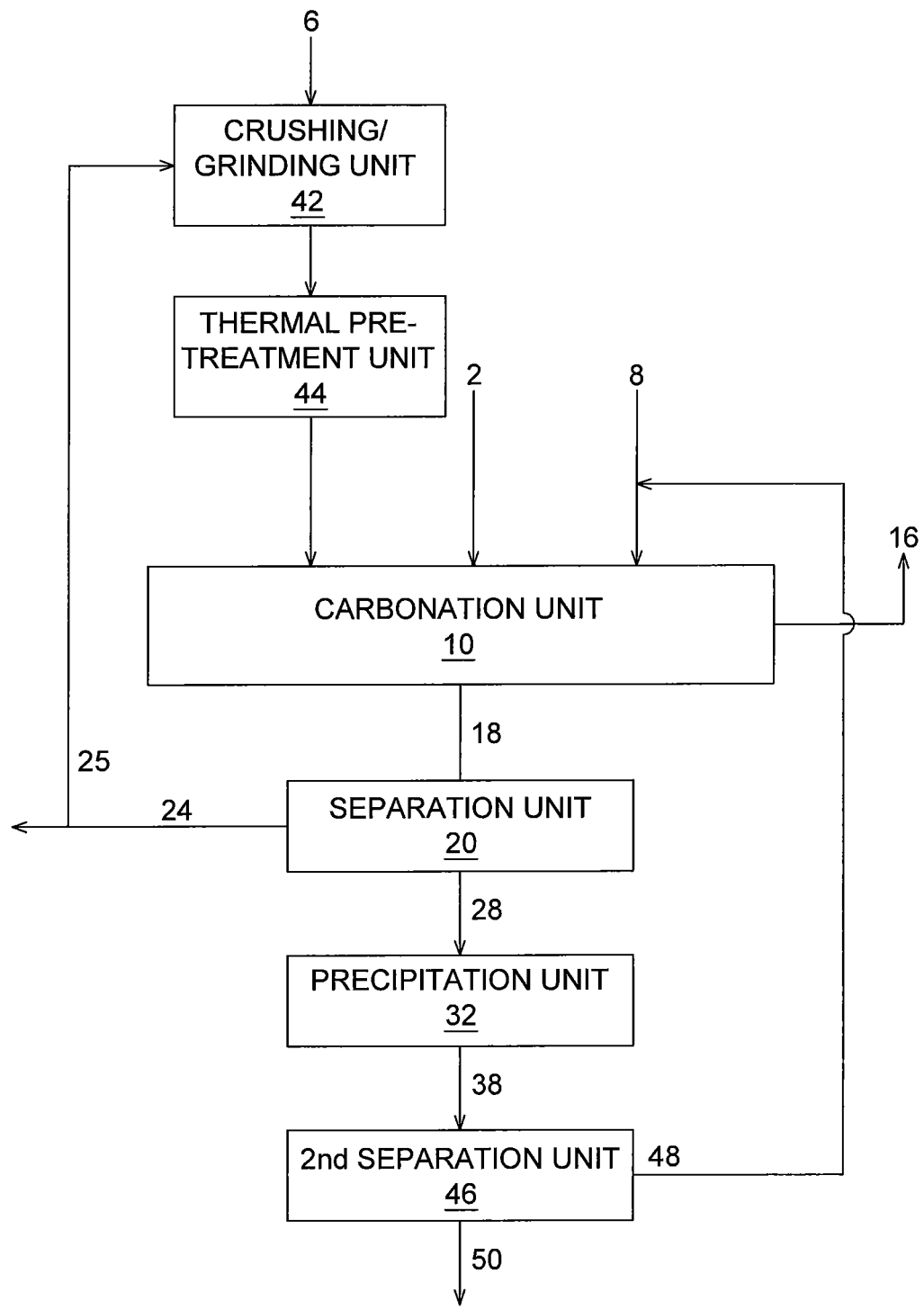
FIG. 3 is a process flow diagram of wet carbonation according to an optional aspect of the present invention.

Referring to FIG. 3, the process may include crushing and/or grinding the alkaline earth metal containing material 6 in a crushing/grinding unit 42 so as to reduce the size of the alkaline earth metal containing material particles. The crushed and/or grinded material 6 is then supplied to a thermal pre-treatment unit 44 for dehydroxylation thereof as mentioned above. The water 8 and the pre-treated material 6 may be supplied to the carbonation unit 10 separately so as to form the aqueous slurry within the carbonation unit 10 for contact with the supplied carbon dioxide containing gas 2 to produce the aqueous slurry 18 including precipitable carbonates and the carbon dioxide depleted gas 16. The aqueous slurry 18 is supplied to the separation unit 20 for separation thereof into the aqueous phase 28 including precipitable carbonates and the solid phase 24. At least a portion 25 of the solid phase 24 may be recycled as at least a part of the alkaline earth metal material 6 to the crushing/grinding unit 42. At least part of the aqueous phase 28 including the precipitable carbonates is supplied to the precipitation unit 32 for precipitation of the alkaline earth metal carbonates and production of the precipitation slurry 38. The precipitation slurry 38 may be supplied to a second separation unit 46 for separation into the alkaline earth metal carbonates stream 50 and a liquid stream 48. At least a portion of the liquid stream 48 may be recycled as at least a portion of the water 8 to the carbonation unit 10.

In some optional aspects, the step of precipitating the alkaline earth metal carbonates may be performed at a precipitation temperature between about 20° C. and about 80° C., and a precipitation time between about 0.5 hours and about 12 hours with or without agitation.

In some optional aspects, the precipitates of alkaline earth metal carbonates produced according to the present process have a purity between 90 and 99.9%.

In some optional aspects, the carbon dioxide containing gas may be supplied continuously to the carbonation unit while keeping a certain or desired carbon dioxide removal efficiency (see Example 5). Optionally, the process may be operated according to a series of batch operations including recycling streams so as to increase the solid material carbonation rate (see Example 6). For example, a recirculation process scenario may be performed such that a same portion of alkaline earth material would contact several portions of carbon dioxide containing gas before precipitation into alkaline earth metal carbonates.

In some optional aspects, the process may include recycling the solid phase separated from the carbonate loaded slurry to produce a new portion of aqueous slurry for contacting with the carbon dioxide containing gas in the carbonation unit. It should be noted that recycling may also be referred to herein as recirculating.

Figure 4:
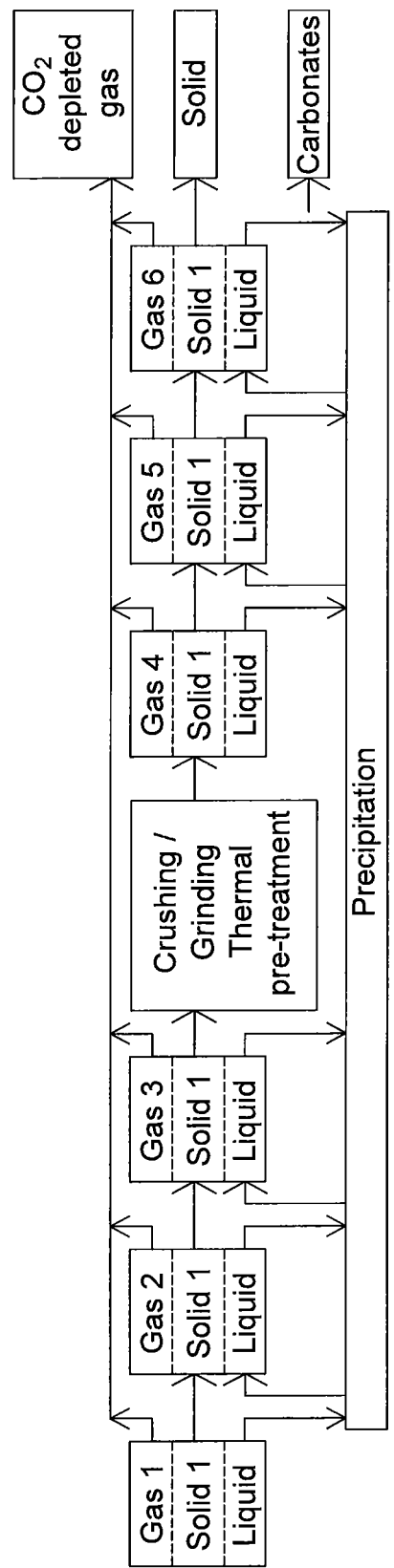
FIG. 4 is a schematic of process steps for wet carbonation with a recirculation scenario according to an optional aspect of the present invention.

FIG. 4 shows a process diagram schematic of the various steps associated with recirculation of various liquid and solid streams according to optional embodiments of the present invention. A plurality of streams may indeed be recycled to the carbonation unit while the carbon dioxide containing gas is supplied continuously or in batch mode to the carbonation unit.

Batch Mode Gas Supply

In some optional aspects, the carbon dioxide containing gas may be supplied to the carbonation unit via carbon dioxide containing gas portions.

Step 1:

A first portion of carbon dioxide containing gas, referred to as "Gas 1", is contacted in the carbonation unit during a specific time by an aqueous slurry, resulting from the combination of "Solid 1" and "Liquid". For example, the aqueous slurry may have a mass concentration in alkaline earth metal containing material of 150 g/L, and the aqueous slurry may be contacting each carbon dioxide containing gas portion during 30 minutes.

After each contacting step of 30 minutes, the produced carbonate loaded slurry is separated into a solid phase and an aqueous phase. It should be noted that the first portion of gas "Gas 1" may be provided as two sub-portions for example so as to comply with pressure limits. Two sub-portions of gas, each contacting the solid for 15 minutes, may therefore be provided successively in the carbonation unit.

A mass balance between the carbon dioxide containing gas and the carbon dioxide depleted gas showed that a maximum of 5.91 g $CO_2$/L of gas (1.64 g C/L of gas) was treated after each contact step of 30 minutes.

Step 2:

The aqueous phase is then supplied to the precipitation unit and once the alkaline earth metal carbonates have sufficiently precipitated, the precipitation slurry is separated into a solid stream and an aqueous stream.

Step 3:

The aqueous stream is then recycled as "Liquid" into the carbonation unit.

The three above mentioned steps 1 to 3 are repeated two more times for contacting second and third portions of carbon dioxide containing gas, referred to as "Gas 2" and "Gas 3".

After contacting with "Gas 2" and "Gas 3", the solid phase "Solid 1" is dried, grinded and heated in the pretreatment unit as previously described.

Steps 1 to 3 are performed three more times with the grinded and heated solid phase "Solid 1" to contact successively "Gas 4", "Gas 5" and "Gas 6". After having contacted six carbon dioxide containing gas portions ("Gas 1" to "Gas 6"), the solid phase reaches its reactivity limits.

All the process steps described above may then be repeated with a new portion of alkaline earth metal containing material.

Continuous Mode Gas Supply

In some other optional aspects, the carbon dioxide containing gas flow may be supplied continuously to the carbonation unit. In batch mode, the key parameter to be controlled was the contact time of a portion of carbon dioxide containing gas. Alternatively, in continuous mode, the key parameter to be controlled is the quantity of dissolved carbon dioxide in the aqueous slurry.

According to the above example of batch mode operation, a maximum of 5.91 g $CO_2$/L of gas (1.64 g C/L of gas) was treated after each contact step of 30 minutes. Considering that all of the treated carbon dioxide is dissolved into the aqueous slurry, the maximum concentration of dissolved carbon dioxide should not exceed about 5.0 g C/L. Above this value, precipitation within the reactor may occur.

Therefore, in continuous mode, once a concentration of dissolved carbon dioxide of 5.0 g C/L is measured in the aqueous slurry, the aqueous slurry is removed from the carbonation unit and separated into the solid phase and the aqueous phase. The aqueous phase is then supplied to the precipitation unit.

Optionally, depending on the precipitation rate of the alkaline earth metal carbonates in the precipitation unit, a certain volume of water could be supplied to the aqueous phase in order to maintain a low dissolved carbon dioxide concentration in the recirculated aqueous phase along the steps.

For example, once the cumulative quantity of treated carbon dioxide has reached 16.04 g $CO_2$/L of gas (4.4 g C/L of gas), the separated solid phase may be dried, grinded and heated before further recycling.

Steps 1 to 3 may therefore be performed again successively following the same scenario as described above, in order to reach a cumulative amount of treated carbon dioxide of about 27.28 g $CO_2$/L of gas (7.47 g C/L of gas) for the overall series of three steps 1 to 3. Then, a new portion of alkaline earth metal containing solid may be used.

It should be understood that any one of the above mentioned aspects of each process, method, system, use and material may be combined with any other of the aspects thereof, unless two aspects clearly cannot be combined due to their mutually exclusivity. For example, the various operational steps of the processes described herein-above, herein-below and/or in the appended figures, may be combined with any of the method, system or use descriptions appearing herein and/or in accordance with the appended claims.

It should also be understood that various parameter values obtained and/or described in any of the examples, tables and description herein may be considered as maximal, minimal or intermediate values, and that various ranges may be derived from these maximal, minimal or intermediate values as described herein or in the appended figures and claims.

EXAMPLES

Example 1: Wet Carbonation of Chrysotile Mining Residues

A first series of experiments were carried out, using chrysotile mining residues composed of lizardite, antigorite, brucite, iron oxides, chromium oxides and a low content of chrysotile, to optimize conditions for the wet carbonation on sample size of around 7 g with grain size inferior to 75 µm and a pulp density of 15% (a mass of 150 g of solid per liter of liquid). The temperature and reaction duration were kept stable at 25° C. and 6 h respectively. The variable parameters are pressure, NaCl and $NaHCO_3$ content and heat treated sample or not. They were optimized on the basis of percentage of $CO_2$ removal and the percentage of solid carbonate formed (dependent variables). The various conditions and results obtained are given in Table 1.

From this table, it appears that a removal of $CO_2$ up to 87% can be achieved for a pressure of 10.2 atm and heat treated sample. $CO_2$ removal seems independent from NaCl content and slightly dependent to $NaHCO_3$ content in the solution, while thermal pre-treatment is necessary. On a run of 6 h, in these conditions, 24% of the sample had been carbonated.

TABLE 1

Box-Benkhen matrix for the first set of assays and results
($T = 25°$ C., $t = 6$ h)

| Run | Pressure (atm) | NaCl (M) | $NaHCO_3$ (M) | Thermal Pre-treatment | $CO_2$ removal (%) | Carbonate solid formation (%) |
|---|---|---|---|---|---|---|
| 1 | 45.9 | 0.5 | 0.32 | Yes | 30 | 0 |
| 2 | 10.2 | 0.5 | 0.64 | Yes | 78 | 5.43 |
| 3 | 10.2 | 1 | 0.32 | No | 49 | 2.24 |
| 4 | 10.2 | 0.5 | 0 | Yes | 79 | 19.13 |
| 5 | 45.9 | 1 | 0 | No | 21 | 0 |
| 6 | 45.9 | 0.5 | 0.32 | No | 27 | 0.4 |
| 7 | 81.7 | 1 | 0.32 | No | 23 | 0.16 |
| 8 | 81.7 | 0.5 | 0.64 | No | 10 | 0.91 |
| 9 | 10.2 | 0 | 0.32 | No | 44 | 0.72 |
| 10 | 45.9 | 0.5 | 0.32 | No | 15 | 0.4 |
| 11 | 81.7 | 1 | 0.32 | Yes | 31 | 0.19 |
| 12 | 45.9 | 0.5 | 0.32 | Yes | 35 | 0.66 |
| 13 | 45.9 | 0 | 0 | Yes | 28 | 0 |
| 14 | 45.9 | 0.5 | 0.32 | No | 15 | 0.68 |
| 15 | 45.9 | 0.5 | 0.32 | No | 13 | 0.33 |
| 16 | 45.9 | 1 | 0.64 | No | 19 | 0.87 |
| 17 | 45.9 | 0.5 | 0.32 | Yes | 45 | 0 |
| 18 | 10.2 | 1 | 0.32 | Yes | 84 | 37.06 |
| 19 | 45.9 | 1 | 0.64 | Yes | 31 | 1.22 |
| 20 | 45.9 | 1 | 0 | Yes | 29 | 0 |
| 21 | 45.9 | 0 | 0.64 | No | 20 | 0.88 |
| 22 | 45.9 | 0.5 | 0.32 | No | 31 | 0.52 |
| 23 | 10.2 | 0.5 | 0 | No | 46 | 0 |
| 24 | 81.7 | 0 | 0.32 | Yes | 32 | 1.21 |
| 25 | 45.9 | 0.5 | 0.32 | Yes | 32 | 0.36 |
| 26 | 10.2 | 0.5 | 0.64 | No | 42 | 2.88 |
| 27 | 45.9 | 0 | 0.64 | Yes | 38 | 0.6 |
| 28 | 81.7 | 0 | 0.32 | No | 13 | 0.57 |
| 29 | 81.7 | 0.5 | 0 | Yes | 32 | 0 |
| 30 | 81.7 | 0.5 | 0.64 | Yes | 37 | 1.25 |
| 31 | 45.9 | 0.5 | 0.32 | Yes | 36 | 0 |
| 32 | 45.9 | 0 | 0 | No | 20 | 0 |
| 33 | 81.7 | 0.5 | 0 | No | 10 | 0 |
| 34 | 10.2 | 0 | 0.32 | Yes | 87 | 40.01 |

The time duration of 6 h for carbonation in optimized conditions was very long, carbonation assays were carried out for shorter reaction time to verify the time dependency of the rate of wet carbonation. The experiments conditions and results are presented in Table 2. Temperature is kept constant at 25° C. and pulp density is kept constant at 15%.

TABLE 2

Experimental conditions and results for wet carbonation of heat treated sample for 30 min duration

| | Input | | | | | |
|---|---|---|---|---|---|---|
| | Time (min) | Volume Liq. (mL) | Weight Spl. (g) | Pressure (atm) | $CO_2$ removal (%) | $PCO_2$ (atm) |
| A | 30 | 50 | 7.02 | 11.2 | 18.2 | 2.03 |
| B | 30 | 50 | 6.90 | 10.3 | 18.2 | 1.87 |
| C | 30 | 50 | 6.87 | 10.8 | 18.2 | 1.96 |

TABLE 2-continued

Experimental conditions and results for wet carbonation of heat treated sample for 30 min duration

| | Output | | | | | |
|---|---|---|---|---|---|---|
| | $CO_2$ Lost (%) | Vol. Liq. End (mL) | Weight Spl. End (g) | Pressure End (atm) | $CO_2$ removal End (%) | $PCO_2$ (atm) |
| A | 83 | 45 | 6.81 | 9.05 | 3.9 | 0.35 |
| B | 82 | 45 | 6.84 | 8.64 | 4.0 | 0.35 |
| C | 82 | 43 | 6.80 | 8.57 | 4.1 | 0.35 |

A removal of 82% of $CO_2$ was achieved after a reaction time of 30 min.

Example 2—Wet Carbonation of Serpentinite

This experiment describes the feasibility of the process for the treatment of a batch of gas containing 18.2% of carbon dioxide during 15 minutes. The gas liquid ratio (GLR) was fixed at 300% which represents a volume of carbon dioxide containing gas of 225 mL and a volume of 75 mL of water. The resulting aqueous slurry had a 15 wt % concentration of solid material. Reaction temperature was set at ambient temperature (18-25° C.). A pressure of 10.5 bars was applied which represented an amount of 0.78 g of $CO_2$ at 20° C. Once the pressure reached, all valves of the reactor were closed and reaction occurred for 15 minutes. The resulting carbon dioxide depleted gas was then sampled through a bag. The carbon dioxide concentration in the carbon dioxide depleted gas was measured by a $CO_2$ analyzer. The resulting aqueous slurry was filtered and samples were taken for analysis.

Reaction under ambient temperature at 10.5 bars during 15 minutes showed an efficiency of 88±1% on the $CO_2$ removal as seen in Table 3.

TABLE 3

Carbon dioxide mass balance for 15 minutes reaction at 10.5 bars (number of assays = 3)

| | Entry | Exit | $CO_2$ treated | Efficiency |
|---|---|---|---|---|
| $CO_2$ (g$CO_2$) | 0.80 ± 0.02 | 0.09 ± 0.01 | 0.71 ± 0.02 | 88 ± 1% |

Example 3—Optimisation of Thermal Pre-Treatment of Serpentinite Before Wet Carbonation Another series of experiments was performed to show that the thermal pre-treatment of the alkaline earth metal containing material favors a good removal of carbon dioxide from the carbon dioxide containing gas.

A serpentinite based mining residue was used as alkaline earth metal containing material. Firstly, depending on the grain size, the residue was crushed, and then grinded. The best results were obtained with samples with a particle size lower than 45 μm (median size 10 μm). In order to obtain a chemically reactive material, the serpentinite based mining residue has to be further pre-treated to allow dehydroxylation of the serpentinite. By removing water from the various crystalline structures of the minerals, the chemical structure of the sample is altered and thus lowers the bound energies. The heat activation of hydrated silicates is well known to favour chemical activation prior to lixiviation [Nagamori et al. (1980) *Activation of magnesia in serpentine by calcination and the chemical utilization of asbestos tailings*—A review. CIM Bulletin 73, pp. 144-156].

Figure 5:
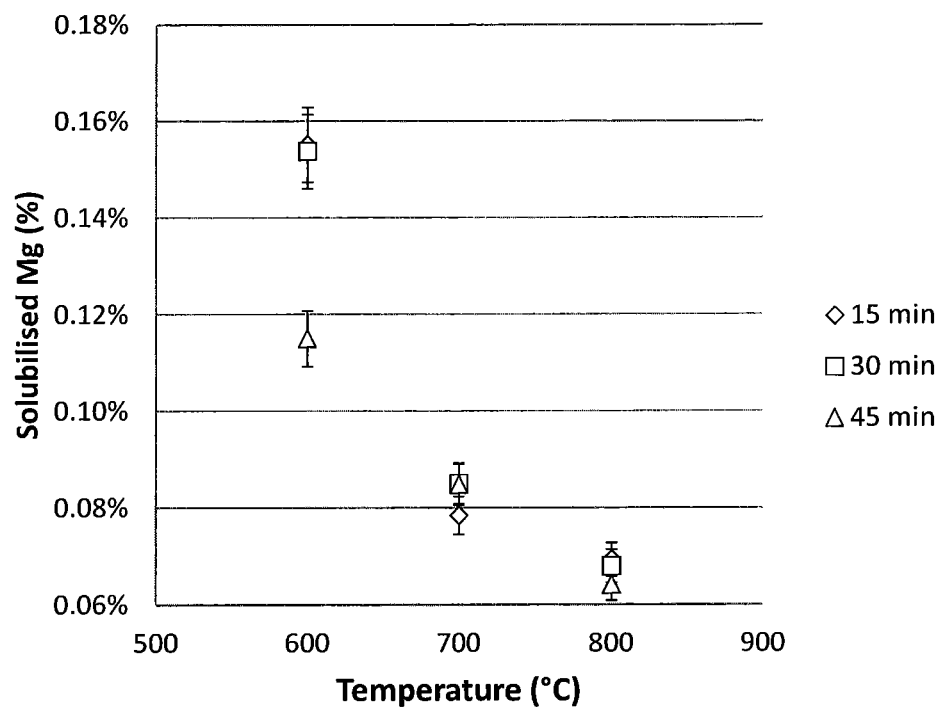
FIG. 5 is a solubilised magnesium quantity vs temperature graph for wet carbonation with three different reaction times according to an optional aspect of the present invention.
Figure 6:
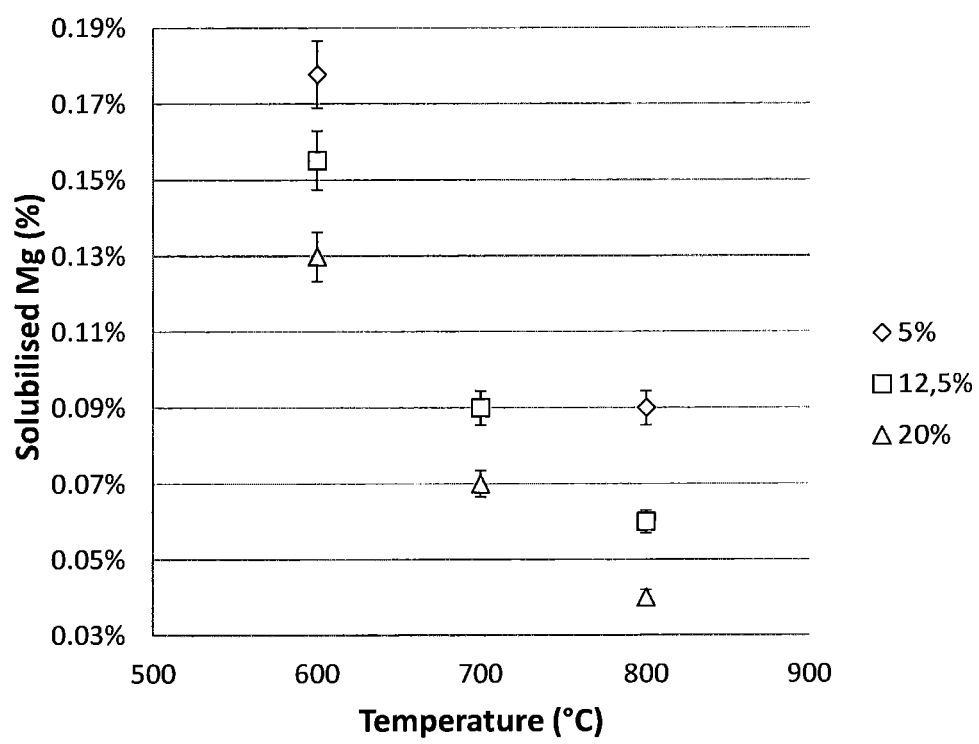
FIG. 6 is a solubilised magnesium quantity vs temperature graph for wet carbonation of an aqueous slurry with three different pulp densities according to an optional aspect of the present invention.

The optimization of thermal pre-treatment was carried out following the magnesium concentration after leaching dissolved in water (beaker). Referring to FIGS. 5 and 6, influence of temperature and pre-treatment time, and the pulp density during the extraction for 30 minutes in water with stirring at 600 rpm have been studied. According to a thermogravimetric analysis, the major weight loss of the sample studied is observed at 650° C. Essays on heat activation showed that best results were obtained after a 30 minutes treatment at 650° C. with a mass loss around 10%.

Example 4—Optimisation of Reaction Parameters for Wet Carbonation

Another series of experiments has been performed to optimize reaction parameters including carbonation pressure, reaction time, gas/liquid ratio (GLR) and pulp density of the aqueous slurry. To enhance gaseous carbon dioxide solubility in water, the reaction temperature was set at room temperature (18-25° C.) as solubility is increased at lower temperatures. Pressure is a key process parameter as it influences the quantity of carbon dioxide introduced in the reactor.

The experiments were conducted with a carbon dioxide containing gas whose characteristics are comparable to a cement plant flue gas. The composition is respectively 18.2% $CO_2$, 4.11% $O_2$, and 77.69% $N_2$. Reactions were realized in a 300 mL stirred reactor from Parr Instrument Company, Moline Ill. USA.

Pressure

Tests on pressure effect showed that working at low pressure was not affecting the reaction efficiency. Indeed, lowering pressure results in introducing a small quantity of carbon dioxide in the reactor. For batch wise experiments, in order to maintain a certain quantity of carbon dioxide introduced in the reactor, pressure was set to 10.5 bars.

GLR and Pulp Density

Parameters such as the gas/liquid ratio (GLR) and the pulp density had been determined by a set of experiments with a reaction time of 30 minutes. Decreasing the GLR did not impact the carbon dioxide removal from the flue gas but decreased the quantity of carbon dioxide introduced in the reactor. On the other hand, the quantity of flue gas treated was lower when pulp density was set at 5%. In order to increase the quantity of gas treated, experiments on GLR and pulp density were realized with successive batch of gas.

Figure 7:
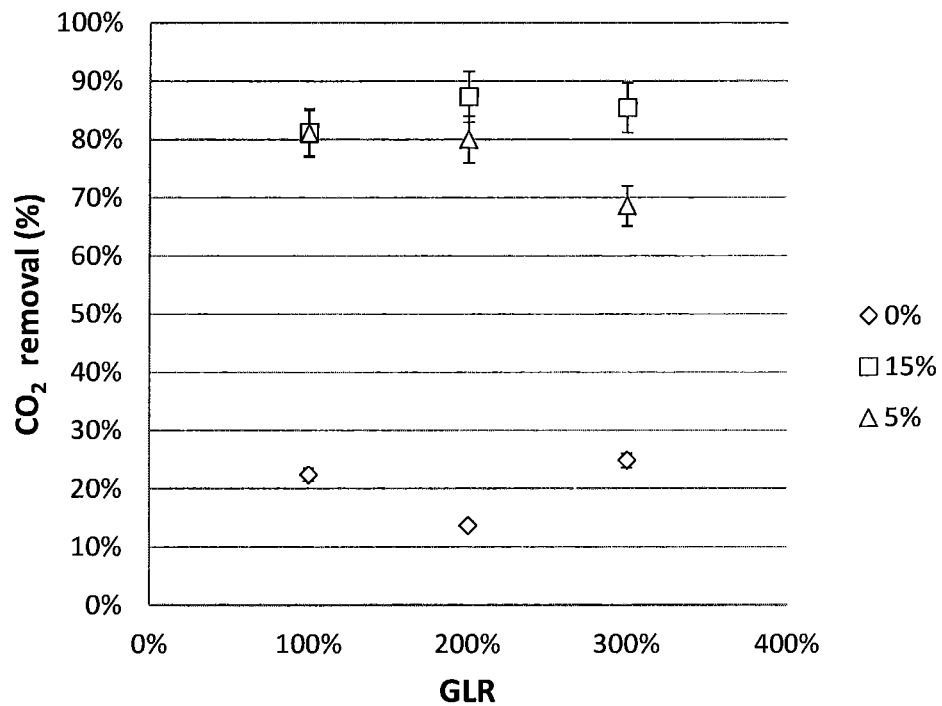
FIG. 7 is a $CO_2$ removal vs gas/liquid ratio (GLR) graph for wet carbonation of an aqueous slurry of various pulp densities according to an optional aspect of the present invention.

As the objective is to form alkaline earth metal carbonates with a resale potential, it is important to have the purest final product possible. Experiments with a GLR of 100% and a pulp density of 15% showed that a significant amount of carbonates was precipitated within the reactor. However, it may be desired to precipitate carbonates outside of the reactor so as to easily separate precipitable carbonates and obtain thereafter carbonates with high purity of about 95%. FIG. 7 shows that good yields of $CO_2$ removal and a high concentration of magnesium in solution are encountered with an aqueous slurry of 15% pulp density and a GLR of 300%.

Once the principal parameters of the reaction were settled, the reaction time was reduced.

Reaction Time

Figure 8:
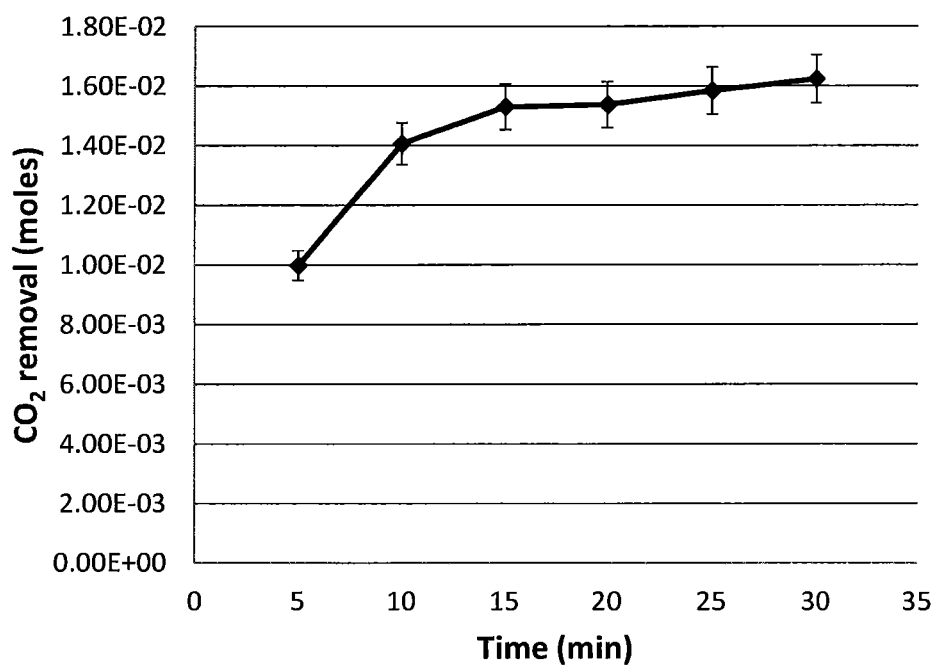
FIG. 8 is a $CO_2$ removal vs time graph for wet carbonation according to an optional aspect of the present invention.

A series of experiments was carried out to reduce the reaction time. FIG. 8 shows the carbon dioxide removal results. The removal was 56% for a reaction time of 5 min, and 83% for a reaction time of 10 min. Same efficiencies as observed for 30 minutes were achieved in 15 minutes. However, the amount of magnesium present in solution is multiplied by 1.45, respectively 341 mg/L for 30 minutes against 495 mg/L for 15 minutes. A residence time of 15 min is reasonable for an industrial application and provides better efficiency on the solubilisation of magnesium.

Example 5—Wet Carbonation of Serpentinite Under Continuous Operation

Figure 9:
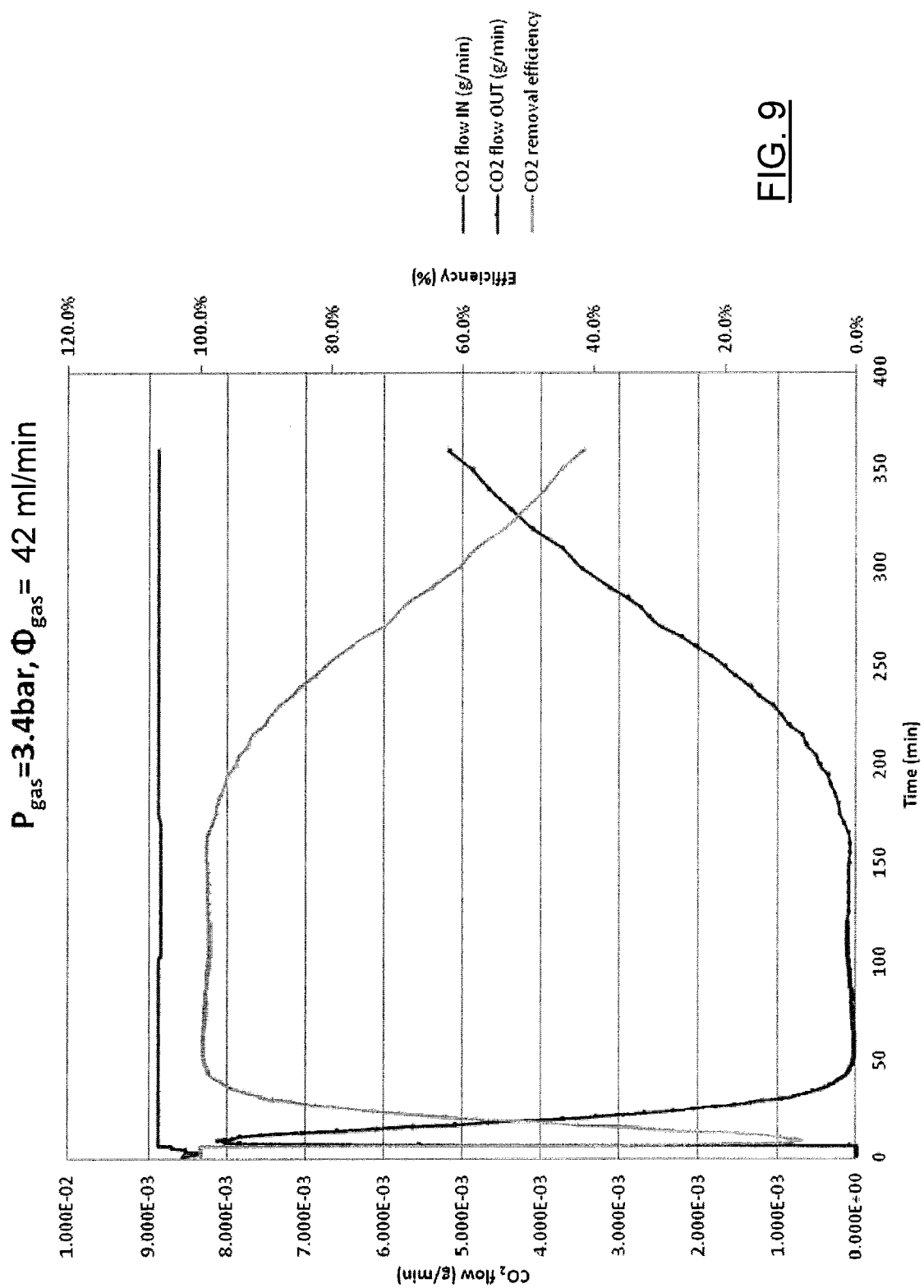
FIG. 9 is a $CO_2$ flow vs time graph for wet carbonation in continuous mode showing $CO_2$ removal efficiency at 3.4 bars and 42 mL/min according to an optional aspect of the present invention.

An experiment has been realized under continuous conditions. The aim was to confirm feasibility of the reaction under gentle conditions of pressure and temperature. Carbon dioxide containing gas flow was regulated by a mass flow controller. Pressure in the reactor was controlled by a pressure gauge valve set at the desired pressure. The experiment was conducted at 3.4 bars with a carbon dioxide containing gas flow of 42 mL/min (7.64 mL $CO_2$/min). Referring to FIG. 9, after an equilibrium phase of around 50 min, it was observed that the efficiency of the carbon dioxide removal stayed constant at more than 98% during 130 minutes. Then, the efficiency decreased following a linear trend. In the end, the overall quantity of carbon dioxide that reacted was 2.61 g $CO_2$ out of the 3.19 g $CO_2$ that were introduced. Compared to the initial magnesium content of the material introduced into the reactor, the overall leaching of the magnesium was 50.8%.

Example 6—Recirculation Scenario

A recirculation scenario is based on treating a plurality of "batches" of carbon dioxide containing gas with recirculated solid streams and liquid streams. Experiments have been performed for series of 6 batches of gas under the same conditions as defined in Example 2. The term "batch" is herein defined by 225 ml of gas (0.78 g $CO_2$) at 10.5 bars reacting for 15 min under an agitation of 600 rpm.

The aqueous slurry was composed of 15% of solid in 75 ml of water and was contacted with two batches of carbon dioxide containing gas before filtration into a solid phase and an aqueous phase. The same filtered solid phase was again mixed in 75 ml of "new" water (or recirculated water) for contacting two more batches of carbon dioxide containing gas. The operation was repeated for a total of 6 batches of carbon dioxide containing gas. After each filtration, the filtered aqueous stream which is rich in dissolved magnesium and carbon dioxide was supplied to a precipitator for precipitation of magnesium carbonates.

Precipitation conditions have been set at 40° C. under 300 rpm agitation. The filtered solid phase, after contacting 6 batches of carbon dioxide containing gas, is grinded and heated in order to improve further magnesium lixiviation. Then, the treated solid phase is recirculated in the reactor for contacting 6 more batches of carbon dioxide containing gas.

A total of 12 batches of carbon dioxide containing gas was therefore treated by the same solid phase. The aqueous phase was filtered after contacting two batches of carbon dioxide containing gas and fresh water was used after contacting two batches of carbon dioxide containing gas.

Results are summarized in Table 4. Carbonation of the solid material is 64% after contact with 12 batches assuming that all the magnesium contained in the aqueous phase precipitated.

TABLE 4

Amount of $CO_2$ treated (g$CO_2$), efficiency of the $CO_2$ removal and Mg lixiviation over 12 batches of 15 min.

| | Batch 1 | Batch 2 | Batch 3 | Batch 4 | Batch 5 | Batch 6 | Batch 7 | Batch 8 | Batch 9 | Batch 10 | Batch 11 | Batch 12 | Cumulative |
|---|---|---|---|---|---|---|---|---|---|---|---|---|---|
| Gas treated | 0.68 | 0.69 | 0.67 | 0.61 | 0.56 | 0.41 | 0.44 | 0.59 | 0.53 | 0.42 | 0.27 | 0.29 | 6.14 g$CO_2$ |
| Efficiency | 86% | 87% | 87% | 77% | 72% | 51% | 75% | 65% | 53% | 34% | 37% | 21% | 62% |
| Mg lixiviated | | 14% | | 14% | | 11% | | 15% | | 7% | | 4% | 64% |

Example 7—Dry Gas-Solid Carbonation

Example 7 describes dry gas-solid carbonation experiments according to optional embodiments of the present invention.

In this series of experiments, the alkaline earth metal containing material was a chrysotile mining residue coming from the region of Thetford Mines directly from the exit of the residue conveyor. The chrysotile residue was crushed and grinded to a mini-particle size of about 50 microns. The reaction took place in a minibench top reactor 4560 of Parr Instrument Company. After the reaction, the gas was sampled in a Tedlar Bags of 3.8 L equipped with an on/off valve. The carbon dioxide concentration in the outlet gas was measured with a $CO_2$, Quantek Instruments, model 906.

The optimization of different parameters that can have significant influence on direct dry gas-solid carbonation was performed in both conventional single variable at a time method and with the statistical response surface methodology.

Optimization of Parameters Using a Conventional Single Variable Method

A series of experiments was carried out to optimize the most suitable conditions for direct dry gas-solid carbonation with conventional single variable variation at a time. The carbonation performance at different temperatures and pressures was optimized on the basis of percentage of $CO_2$ removal (dependent variable). Optimized conditions were evaluated for raw, non magnetic (Non-Mag) and heat treated samples. The optimized conditions for each type of sample were given in Table 5.

TABLE 5

Optimized conditions for direct dry gas-solid carbonation with different type of samples

| Sample type | Sample size (g) | Heat-treatment (° C., min) | Temperature (° C.) | Pressure (atm) | Time (h) | Average $CO_2$ removal (%) |
|---|---|---|---|---|---|---|
| Raw | 25 | No | 200 | 5 | 6 | 27.7 ± 0.6 |
| Non-Mag | 25 | No | 200 | 5 | 6 | 28.9 ± 0.6 |
| Raw | 25 | 630, 30 | 200 | 5 | 6 | 36.8 ± 2.4 |

The operating conditions for direct dry carbonation were optimized at 5 atm pressure and 200° C. temperature for 6 h duration. A maximum $CO_2$ removal of 36.8% was obtained with raw heat treated (at 630° C. for 30 min and grinded) sample.

Optimization of Parameters Using a Box-Behnken Design

The independent variable selected are temperature (X1), pressure (X2) and time (X3) and the independent response variable selected are $CO_2$ removal, Y1(%) and pressure variation, Y2 (kPa). Since the removal $CO_2$ is the key factor in this experiment, the present study focused on the percentage removal of $CO_2$. So, the percentage of $CO_2$ removal was chosen as the major response surface in this model. Heat treated (630° C. for 30 min) sample of 25 g was used for all runs.

Figure 10:
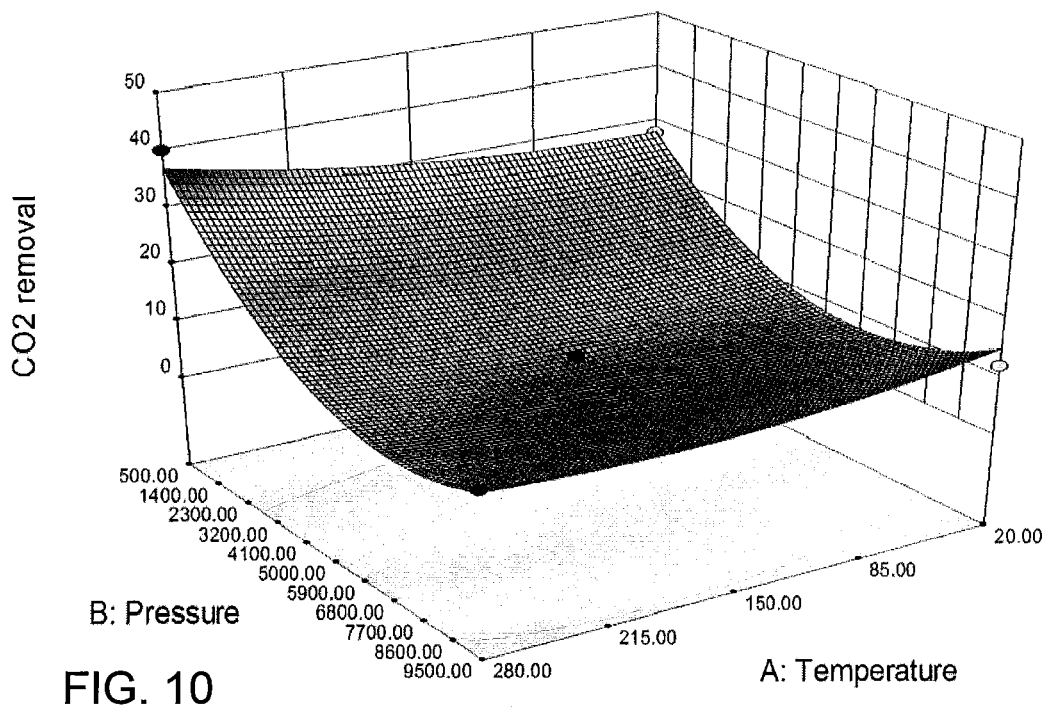
FIG. 10 is a response surface graph showing the interaction of temperature and pressure on $CO_2$ removal percentage in direct dry gas solid carbonation.

FIG. 10 shows the response surface graph for $CO_2$ removal (%) and from the figure it is clear that the $CO_2$ removal (%) is at its maximum at low pressure and higher temperature region. The optimal conditions and validation of optimized value are presented in Table 6. The variance analysis of the quadratic regression parameter for the predicted response surface of $CO_2$ removal (%) was analyzed by ANOVA.

The Model F-value of 30.56 and low probability value "Prob>F" less than 0.050 implies the model is significant. The value of multiple regression coefficients ($R^2$=0.9752) shows that only 2.5% of the total variation could not be explained by the empirical model. This model could explain 97.5% of the variability of response. The $R^2$ (0.9752) for $CO_2$ removal (%) was found in reasonable agreement with the adjusted $R^2$ value (0.9433). The predicted $R^2$ (0.70) was in reasonable agreement with adjusted $R^2$.

The optimized conditions for direct dry gas-solid carbonation by using Box-Behnken design was obtained at 258° C., 5.6 atm for 310 min. A $CO_2$ removal of 40.1% was predicted at the above conditions.

The validation of the model shows a $CO_2$ removal of 37%, which is close to the predicted value.

TABLE 6

Validation experiments of the response surface model (RSM)

| Experiments (No.) | Temperature (° C.) | Pressure (atm) | Time (min) | $CO_2$ removal (%) |
|---|---|---|---|---|
| RSM Model | 258* | 5.53* | 310* | 40.1** |
| A | 258 | 5.53 | 310 | 37.9 |
| B | 258 | 5.53 | 310 | 36.2 |

TABLE 6-continued

Validation experiments of the response surface model (RSM)

| Experiments (No.) | Temperature (° C.) | Pressure (atm) | Time (min) | $CO_2$ removal (%) |
|---|---|---|---|---|
| C | 258 | 5.53 | 310 | 37.4 |
| Average | | | | 37.1 ± 0.8 |

*Optimum values of variables selected by the model.
**Predicted values for each response according to the model.

Carbonation studies were also conducted with raw and non magnetic sample at optimized conditions obtained from response surface methodology. The experiments and results are given in Table 7 and it shows that in optimized conditions, the $CO_2$ removal (%) for three type of samples are in close range. This indicates that the pre-treatment of sample does not make any significant effect in $CO_2$ removal (%).

TABLE 7

Experimental conditions and results for direct dry gas-solid carbonation of different type of samples at optimized conditions established by response surface methodology

| Sample type | Temperature (° C.) | Pressure (atm) | Time (min) | $CO_2$ removal (%) |
|---|---|---|---|---|
| Raw | 258 | 3.95 | 310 | 35.7 ± 1.1 |
| Non-Mag | 258 | 2.96 | 310 | 35.7 |
| Heat treated | 258 | 1.97 | 310 | 37.1 ± 0.8 |

Since time duration for carbonation in optimized conditions seems to be very long 310 min, carbonation assays were carried out for shorter reaction time to verify the time dependency of the rate of dry carbonation. The experiments and results are presented in Table 8.

TABLE 8

Experimental conditions and results for direct dry carbonation of raw sample at optimized temperature and pressure for 15 min duration

| Run | Temperature (° C.) | Pressure (atm) | Time (min) | $CO_2$ removal (%) |
|---|---|---|---|---|
| A | 258 | 3.95 | 15 | 36.3 |
| B | 258 | 2.96 | 15 | 39.0 |
| C | 258 | 1.97 | 15 | 33.5 |
| Average | | | | 36.3 ± 2.7 |

Figure 11:
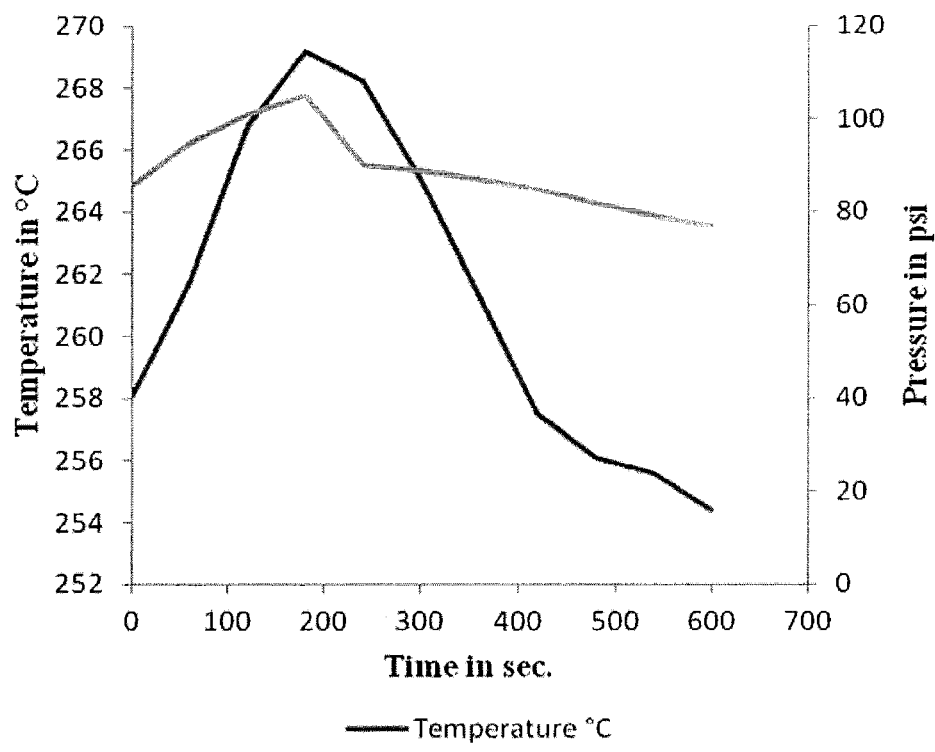
FIG. 11 is a pressure versus time graph of gas/solid carbonation at a temperature of 258° C., and a pressure of 5.6 atm over 10 minutes according to an optional aspect of the present invention.

From the results, it was found that the major percentage of reaction occurs during the initial stage of carbonation reaction. The reaction achieved about 36% of $CO_2$ removal at 258° C., 5.53 atm within 15 min. This would suggest that major percentage of carbonation takes place within a time limit after which the reaction might become less important. The pressure variation curve given in FIG. 11 supports the above statement. The sudden decrease in pressure at the initial minutes indicates that the reaction occur fast at initial and then the decrease, in pressure becoming very slow or constant indicates the carbonation occur very slow or attained equilibrium. The increase in pressure and temperature right after the addition of the $CO_2$ gas mixture might be due to the exothermic character of the reaction. The decrease in rate of reaction after certain time might be due to the formation of product layer, which might further hinder the inward diffusion of $CO_2$ and outward diffusion of water. The lesser surface renewal rate could also diminish the rate of carbonation, which could be increased by increasing the rate of particle attrition and abrasion through well mixing.

Example 8—Comparison of $CO_2$ Removal Efficiencies

Experiments have been performed to compare the $CO_2$ removal efficiency for wet and dry carbonation of various alkaline earth metal containing materials.

Results for wet carbonation are shown in Table 9 and results for dry carbonation are shown in Table 10.

TABLE 9

Wet carbonation of 150 g/L of solid during 15 minutes at ambient temperature, P = 10.5 bars

| Sample/Test | Thermal pre-treatment | Average $CO_2$ input (g) | Average $CO_2$ output (g) | Average % $CO_2$ uptake | Std |
|---|---|---|---|---|---|
| Bignel Stone-pit (St urbain) - Anorthosite | no | 0.78 | 0.52 | 34.51 | 2.47 |
| Bouchard stone-pit (St Urbain)-Anorthosite | no | 0.78 | 0.43 | 44.37 | 10.18 |
| Old Gen. electrique stone-pit (St Urbane-Anorthosite | no | 0.76 | 0.45 | 40.51 | 15.49 |
| andesine (BML Charlesbourg stone-pit) | no | 0.78 | 0.47 | 39.77 | 7.66 |
| concrete brick | no | 0.76 | 0.34 | 55.64 | 11.85 |
| concrete with aggregates | no | 0.79 | 0.29 | 63.41 | 2.59 |
| concrete | no | 0.78 | 0.17 | 78.44 | 1.21 |
| steelmaking slag | no | 0.76 | 0.12 | 84.51 | 4.23 |
| Red brick | no | 0.78 | 0.43 | 44.71 | 9.60 |
| Antigorite (Thetford Mines stone-pit) | yes | 0.78 | 0.32 | 58.89 | 2.94 |
| sandstone (Montmagny stone-pit) | no | 0.79 | 0.40 | 49.35 | 2.47 |
| worn MgO brick (steelmaking) | no | 0.77 | 0.43 | 44.62 | 2.23 |
| Wollastonite (Black Lake stone-pit) | no | 0.78 | 0.46 | 40.80 | 2.04 |
| olivine sand | no | 0.77 | 0.47 | 38.78 | 1.94 |
| Granite (Aguanish stone-pit) | no | 0.77 | 0.49 | 37.06 | 1.85 |
| Magnesium rich Basalt (St Joseph de Beauce stone-pit) | no | 0.80 | 0.54 | 32.90 | 1.64 |
| Calcium rich Basalt RayCar (St Flavie stone-pit) | no | 0.77 | 0.55 | 28.68 | 1.43 |
| Granite (Aguanish stone-pit) | yes | 0.77 | 0.57 | 25.12 | 1.26 |
| CaO Rotary kiln dust | no | 0.77 | 0.04 | 95.38 | 4.77 |
| MgO Rotary kiln dust | no | 0.75 | 0.05 | 93.20 | 4.66 |

TABLE 10

Dry carbonation of 1.5 g of solid during 30 minutes at T = 258° C., P = 4 bars

| Sample Test | Thermal pre-treatment | Average $CO_2$ input (g) | Average $CO_2$ output (g) | Average $CO_2$ utpake (%) | Std |
|---|---|---|---|---|---|
| Bignel Stone-pit (St urbain) - Anorthosite | no | 0.17 | 0.09 | 43.37 | 6.74 |
| concrete | no | 0.16 | 0.02 | 74.83 | 1.58 |
| concrete brick | no | 0.17 | 0.04 | 74.79 | 6.63 |
| concrete with aggregates | no | 0.16 | 0.07 | 58.03 | 4.66 |
| Bouchard stone-pit (St Urbain)-Anorthosite | no | 0.17 | 0.09 | 46.98 | 5.44 |
| Old Gen. Electrique (St Urabin) | no | 0.18 | 0.03 | 81.14 | 2.95 |
| Andesine (BML Charlesbourg stone-pit | no | 0.17 | 0.10 | 39.90 | 10.30 |
| Red brick | no | 0.18 | 0.10 | 41.07 | 12.56 |
| steelmaking slag | no | 0.18 | 0.09 | 47.18 | 16.72 |

TABLE 10-continued

Dry carbonation of 1.5 g of solid during 30 minutes at T = 258° C., P = 4 bars

| Sample Test | Thermal pre-treatment | Average $CO_2$ input (g) | Average $CO_2$ output (g) | Average $CO_2$ utpake (%) | Std |
|---|---|---|---|---|---|
| worn MgO brick (steelmaking) | no | 0.18 | 0.05 | 70.67 | 0.40 |
| CaO Rotary kiln dust | no | 0.16 | 0.10 | 37.99 | |
| sandstone (Montmagny stone-pit) | no | 0.22 | 0.14 | 34.08 | 0.78 |
| Calcium rich Basalt RayCar (St Flavie stone-pit) | no | 0.22 | 0.13 | 38.75 | 1.92 |
| Magnesium rich Basalt (St Joseph de Beauce stone-pit) | no | 0.22 | 0.13 | 40.38 | 0.39 |
| Granite (Aguanish stone-pit) | no | 0.22 | 0.13 | 40.10 | 0.78 |
| Granite (Aguanish stone-pit) | yes | 0.22 | 0.13 | 41.48 | 1.95 |
| olivine sand | no | 0.22 | 0.12 | 43.13 | 1.17 |
| Wollastonite (Black Lake stone-pit) | no | 0.22 | 0.12 | 43.13 | 1.17 |
| Antigorite (Thetford Mines stone-pit) | yes | 0.22 | 0.13 | 42.31 | 0.78 |
| Serpentinite (Black Lake) | no | 0.22 | 0.13 | 42.05 | 5.07 |
| Serpentinite (Black Lake) | yes | 0.22 | 0.14 | 23.2 | 5.82 |
| MgO Rotary kiln dust | no | 0.22 | 0.14 | 37.34 | |

That which is claimed is:

1. A process for sequestering carbon dioxide and producing magnesium carbonate, the process comprising:
   thermally pre-treating a magnesium-containing particulate material where 90% of the solid particles have a particle size equal to or less than about 75 µm, for dehydroxylation thereof, to produce a pre-treated magnesium-containing particulate material;
   contacting the pre-treated magnesium-containing particulate material with water and a carbon dioxide containing gas, to form a loaded slurry and a carbon dioxide depleted gas;
   separating the loaded slurry from the carbon dioxide depleted gas;
   separating the loaded slurry into at least a loaded aqueous stream and a solids-enriched stream;
   subjecting the loaded aqueous stream to precipitation to form a precipitation slurry comprising magnesium carbonate precipitates; and
   subjecting the precipitation slurry to separation to produce a precipitated magnesium carbonate material and a precipitate depleted stream.

2. The process of claim 1, wherein the loaded slurry has mass concentration between 25 g/L and 300 g/L in grams of total solids per liter of the loaded slurry.

3. The process of claim 1, further comprising drying the precipitated magnesium carbonate material to form a dried product.

4. The process of claim 1, further comprising recycling at least a portion of the precipitate depleted stream for contacting the pre-treated magnesium-containing particulate material and the carbon dioxide containing gas.

5. The process of claim 4, further comprising recycling at least a portion of the solids-enriched stream back for contacting the carbon dioxide containing gas and the precipitate depleted stream.

6. The process of claim 1, wherein the magnesium-containing particulate material further has a median particle size between about 10 µm and about 45 µm.

7. The process of claim 6, further comprising crushing and/or grinding the magnesium-containing particulate material to obtain the particle size equal to or less than about 75 µm and the median particle size between about 10 µm and about 45 µm.

8. The process of claim 1, wherein the carbon dioxide containing gas comprises industrial emissions and has a carbon dioxide concentration between 1% and 30%.

9. The process of claim 1, wherein the step of contacting the pre-treated magnesium-containing particulate material with water and a carbon dioxide containing gas is performed in a carbonation unit at a carbonation temperature between about 10° C. and about 40° C. and at a carbonation pressure between about 1 bar and about 12 bars.

10. The process of claim 1, wherein the loaded slurry is substantial free of precipitated magnesium carbonate particles.

11. The process of claim 10, wherein the loaded slurry is substantial free of precipitated calcium carbonate particles.

12. The process of claim 11, wherein the loaded slurry is substantial free of any precipitated alkaline earth metal carbonates.

13. The process of claim 1, wherein the precipitating is performed at a precipitation temperature between about 20° C. and about 80° C. for a precipitation time between about 0.5 hours and about 12 hours.

14. The process of claim 1, wherein the magnesium-containing particulate material comprises serpentinite.

15. The process of claim 1, wherein the magnesium-containing particulate material comprises mining residue.

16. The process of claim 1, further comprising grinding the solids-enriched stream to produce a pre-ground material and then recycling at least a portion of the pre-ground material back for contacting the carbon dioxide containing gas.

17. The process of claim 1, wherein the precipitated magnesium carbonate material is at least 95 wt % in hydrated form.

18. The process of claim 1, wherein the thermally pre-treating is performed in a thermal pre-treatment unit, the contacting and the separating of the loaded slurry from the carbon dioxide depleted gas re performed in a carbonation unit, the separating of the loaded slurry into at least a loaded aqueous stream and a solids-enriched stream is performed in a separation unit, and the precipitation is performed in a precipitation unit.

19. A process for sequestering carbon dioxide and producing magnesium carbonate, the process comprising:
   contacting a dehydroxylated magnesium-containing particulate material with water and a carbon dioxide containing gas, to form a loaded slurry and a carbon dioxide depleted gas;
   separating the loaded slurry from the carbon dioxide depleted gas;
   separating the loaded slurry into at least a loaded aqueous stream and a solids-enriched stream;
   subjecting the loaded aqueous stream to precipitation to form a precipitation slurry comprising magnesium carbonate precipitates; and
   subjecting the precipitation slurry to separation to produce a precipitated magnesium carbonate material and a precipitate depleted stream.

20. The process of claim 19, wherein the loaded slurry has mass concentration between 25 g/L and 300 g/L in grams of total solids per liter of the loaded slurry; 90% of the dehydroxylated magnesium-containing particulate material has a particle size equal to or less than about 75 µm; the carbon dioxide containing gas comprises industrial emissions and has a carbon dioxide concentration between 1% and 30%; the step of contacting the dehydroxylated magnesium-containing particulate material with water and a carbon dioxide containing gas is performed in a carbonation unit at a carbonation temperature between about 10° C. and about 40° C. and at a carbonation pressure between about 1 bar and about 12 bars; the loaded slurry is substantial free of precipitated magnesium carbonate particles; and the precipitating is performed at a precipitation temperature between about 20° C. and about 80° C. for a precipitation time between about 0.5 hours and about 12 hours.

* * * * *